United States Patent
Hawkins et al.

(10) Patent No.: US 10,302,209 B2
(45) Date of Patent: May 28, 2019

(54) STABILIZER CARTRIDGE FOR A FLUID REGULATOR

(71) Applicant: EMERSON PROCESS MANAGEMENT REGULATOR TECHNOLOGIES, INC., McKinney, TX (US)

(72) Inventors: James C. Hawkins, Allen, TX (US); David B. Davis, Whitewright, TX (US); Tung K. Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 91 days.

(21) Appl. No.: 15/253,788

(22) Filed: Aug. 31, 2016

(65) Prior Publication Data
US 2018/0058596 A1   Mar. 1, 2018

(51) Int. Cl.
    F16K 17/04   (2006.01)
    G05D 16/06   (2006.01)
    F16K 31/126  (2006.01)

(52) U.S. Cl.
    CPC ........ *F16K 17/048* (2013.01); *F16K 17/0413* (2013.01); *F16K 31/1262* (2013.01); *G05D 16/0683* (2013.01)

(58) Field of Classification Search
    CPC ............... F16K 17/048; F16K 17/0413; F16K 31/1262; G05D 16/0683; Y10T 137/7831; Y10T 137/783; Y10T 137/261
    See application file for complete search history.

(56) References Cited

U.S. PATENT DOCUMENTS

| | | | | |
|---|---|---|---|---|
| 2,670,574 A | * | 3/1954 | Schuster | G05D 16/0683 137/315.04 |
| 2,827,069 A | * | 3/1958 | Peterson | G05D 16/0683 137/116.5 |
| 3,042,064 A | * | 7/1962 | Pommersheim | F16K 31/165 137/116.5 |
| 3,488,685 A | * | 1/1970 | Hughes | G05D 16/0683 137/116.5 |
| 3,705,599 A | * | 12/1972 | Sheward | G05D 16/0688 137/116.5 |
| 3,892,255 A | * | 7/1975 | Johnson | G05D 16/0683 137/116.5 |
| 5,402,820 A | | 4/1995 | Duffy et al. | |

(Continued)

OTHER PUBLICATIONS

International Search Report for Application No. PCT/US2017/048222, dated Dec. 8, 2017.

(Continued)

*Primary Examiner* — Jessica Cahill
(74) *Attorney, Agent, or Firm* — Marshall, Gerstein & Borun LLP

(57) ABSTRACT

A stabilizer cartridge for enhancing stability of a fluid regulator is provided. The stabilizer cartridge includes a body, a first disk, and a second disk. The body is adapted to be disposed around a valve stem of the fluid regulator. The first disk is coupled to the body and defines one or more flow paths for facilitating pressure relief. The second disk is movably coupled to the body and is movable relative to the first disk responsive to fluid flow through the one or more flow paths of the first disk.

18 Claims, 4 Drawing Sheets

(56) References Cited

U.S. PATENT DOCUMENTS

| | | |
|---|---|---|
| 8,256,446 B2 | 9/2012 | Hawkins et al. |
| 8,256,452 B2 | 9/2012 | Hawkins |
| 2001/0009161 A1* | 7/2001 | Berger ............... G05D 16/0663 137/116.5 |
| 2004/0007270 A1 | 1/2004 | Olds |
| 2012/0111425 A1* | 5/2012 | Hawkins ............ G05D 16/0683 137/489 |
| 2014/0090727 A1* | 4/2014 | Nguyen ............. G05D 16/0694 137/505.18 |
| 2015/0240969 A1 | 8/2015 | Lin et al. |

OTHER PUBLICATIONS

Written Opinion for Application No. PCT/US2017/048222, dated Dec. 8, 2017.

\* cited by examiner

STABILIZER CARTRIDGE FOR A FLUID REGULATOR

FIELD OF THE DISCLOSURE

The present disclosure is directed to fluid regulators, and, more particularly, a stabilizer cartridge for a fluid regulator.

BACKGROUND

Fluid regulators, also referred to herein as pressure regulators, are used in a myriad of industrial and residential applications for controlling the downstream pressure of a fluid. For example, in chemical processing plants or oil refineries, fluid regulators are used to manipulate a flowing fluid to compensate for increases or decreases in demand, or other load disturbances, and thus keep the fluid pressure regulated. Similarly, fluid regulators may be used in plumbing fixtures to maintain a pre-determined pressure of fluid that automatically adjusts to variations in demand, such as anti-scald valves in showers or faucets. By controlling downstream pressure, fluid regulators compensate for variations in downstream demand. For example, as downstream demand increases, fluid regulators open to allow more fluid to flow through the fluid regulator, thus maintaining a relatively constant downstream pressure. On the other hand, as downstream demand decreases, fluid regulators close to reduce the amount of fluid flowing through the fluid regulator, again maintaining a relatively constant downstream pressure.

In some cases, the operational stability, and thus the capacity and performance, of the fluid regulator may be adversely affected by other components used in conjunction with the fluid regulator. In some basic utility applications, for example, the natural frequency of the pipeline system used with the fluid regulator may create a harmonic resonation that is communicated to the fluid regulator. As another example, large capacity meters, e.g., a Rotary Meter, located downstream of the fluid regulator may serve to send pulsations through the flow stream that resonate within the fluid regulator. Additionally, new burner technologies, e.g., Pulse Boilers, developed to improve burner efficiency, may create pulsating feedback that resonates within the fluid regulator and/or causes the fluid regulator to pulsate in sympathy with such feedback.

SUMMARY

In accordance with a first exemplary aspect, a stabilizer cartridge is provided for enhancing stability of a fluid regulator having a regulator body, a control element configured to control a fluid flow through the regulator body, a valve stem coupled to the control element, and an actuator assembly operatively coupled to the valve stem to control a position of the control element. The stabilizer cartridge includes a body adapted to be disposed around the valve stem, a first disk coupled to the body and defining one or more flow paths for facilitating pressure relief, and a second disk movably coupled to the body, the second disk being movable relative to the first disk responsive to fluid flow through the one or more flow paths of the first disk.

In accordance with a second exemplary aspect, a stabilizer cartridge is provided for enhancing stability of a fluid regulator having a regulator body, a control element configured to control a fluid flow through the regulator body, a valve stem coupled to the control element, and an actuator assembly operatively coupled to the valve stem to control a position of the control element. The stabilizer cartridge includes a body, a first disk, a second disk, and a biasing element. The body is adapted to be disposed around the valve stem, the body having a first end and a second end opposite the first end. The first disk is coupled to the body proximate the first end, the first disk defining one or more flow paths for facilitating pressure relief. The second disk is movably coupled to the body, the second disk being movable relative to the first disk responsive to fluid flow through the one or more flow paths of the first disk. The biasing element is arranged between the second disk and the second end of the body, the biasing element configured to bias the second disk toward the first disk.

In accordance with a third exemplary aspect, a fluid regulator is provided. The fluid regulator includes a regulator body, a control element, a valve stem coupled to the control element, an actuator assembly, and a stabilizer cartridge. The regulator body defines an inlet, an outlet, and a fluid passageway between the inlet and the outlet, the fluid flow passageway including a throat area. The control element is configured to control fluid flow through the fluid passageway. The actuator assembly is operatively coupled to the valve stem to control a position of the control element, the actuator including an actuator housing, a diaphragm disposed in the actuator housing, the diaphragm configured to sense a pressure at the outlet via the throat area, a first chamber defined adjacent a first side of the diaphragm, a second chamber defined adjacent a second side of the diaphragm, and an exhaust port formed in the actuator housing to fluidly couple the second chamber to atmosphere. The stabilizer cartridge is arranged between the first chamber and the throat area of the regulator body, and includes a body, a first disk, and a second disk. The body is sized to receive the valve stem. The first disk is coupled to the body and defines one or more flow paths, the one or more flow paths in selective fluid communication with the exhaust port. The second disk is movably coupled to the body, the second disk being movable relative to the first disk, responsive to fluid flowing through the one or more flow paths, between a first position, in which the second disk sealingly engages the flow paths of the first disk, such that the flow paths are not in fluid communication with the exhaust port, and a second position, in which the second disk is spaced from the flow paths of the first disk, such that the flow paths are in fluid communication with the exhaust port.

In further accordance with any one or more of the foregoing first, second, or third exemplary aspects, a stabilizer cartridge and/or a fluid regulator may include any one or more of the following further preferred forms.

In one preferred form, the body comprises a bore sized to receive the valve stem.

In another preferred form, the stabilizer cartridge further includes a biasing element arranged to bias the second disk into contact with the first disk.

In another preferred form, the body includes a flanged portion, the biasing element being disposed around the body between the flanged portion and the second disk.

In another preferred form, the second disk is movable between a first position, in which the second disk contacts the first disk such that the one or more flow paths are closed, and a second position, in which the second disk is spaced from the first disk such that the one or more flow paths are opened.

In another preferred form, the first disk has a first diameter and the second disk has a second diameter less than the first diameter.

In another preferred form, the first disk includes one or more windows defining the one or more flow paths, the one or more windows being concentrically arranged about the body.

In another preferred form, the stabilizer cartridge further includes an aperture formed in the first disk for sensing pressure at an outlet of the regulator body.

In another preferred form, responsive to an over pressure condition, the second disk moves from the first position to the second position, such that the fluid flows to the exhaust port to relieve the over pressure condition.

In another preferred form, the stabilizer cartridge further includes an aperture formed in the first disk, and wherein the diaphragm senses a pressure at the outlet via the aperture.

In another preferred form, the stabilizer cartridge further includes a biasing element arranged to bias the second disk to the first position.

In another preferred form, the body includes a flanged portion, the biasing element being disposed around the body between the flanged portion and the second disk.

In another preferred form, the fluid regulator further includes a pressure relief valve. Responsive to an overpressure condition, the pressure relief valve is movable relative to the diaphragm from a first position in which the pressure relief valve engages the diaphragm, preventing fluid communication between the first and second chambers, to a second position in which the pressure relief valve is separated from the diaphragm, allowing fluid communication between the first and second chambers.

DETAILED DESCRIPTION

The present disclosure is directed to a stabilizer cartridge for use with a fluid regulator to enhance the stability of the fluid regulator without affecting the operational performance of the fluid regulator. More specifically, the stabilizer cartridge helps to substantially, if not entirely, block pulsations generated by other components of a process control system in which the fluid regulator is employed, thereby preventing such pulsations from resonating within the fluid regulator. At the same time, the stabilizer cartridge facilitates a sufficient level fluid flow to an internal pressure relief valve of the fluid regulator to relieve an over pressure condition, should one occur.

Figure 1:
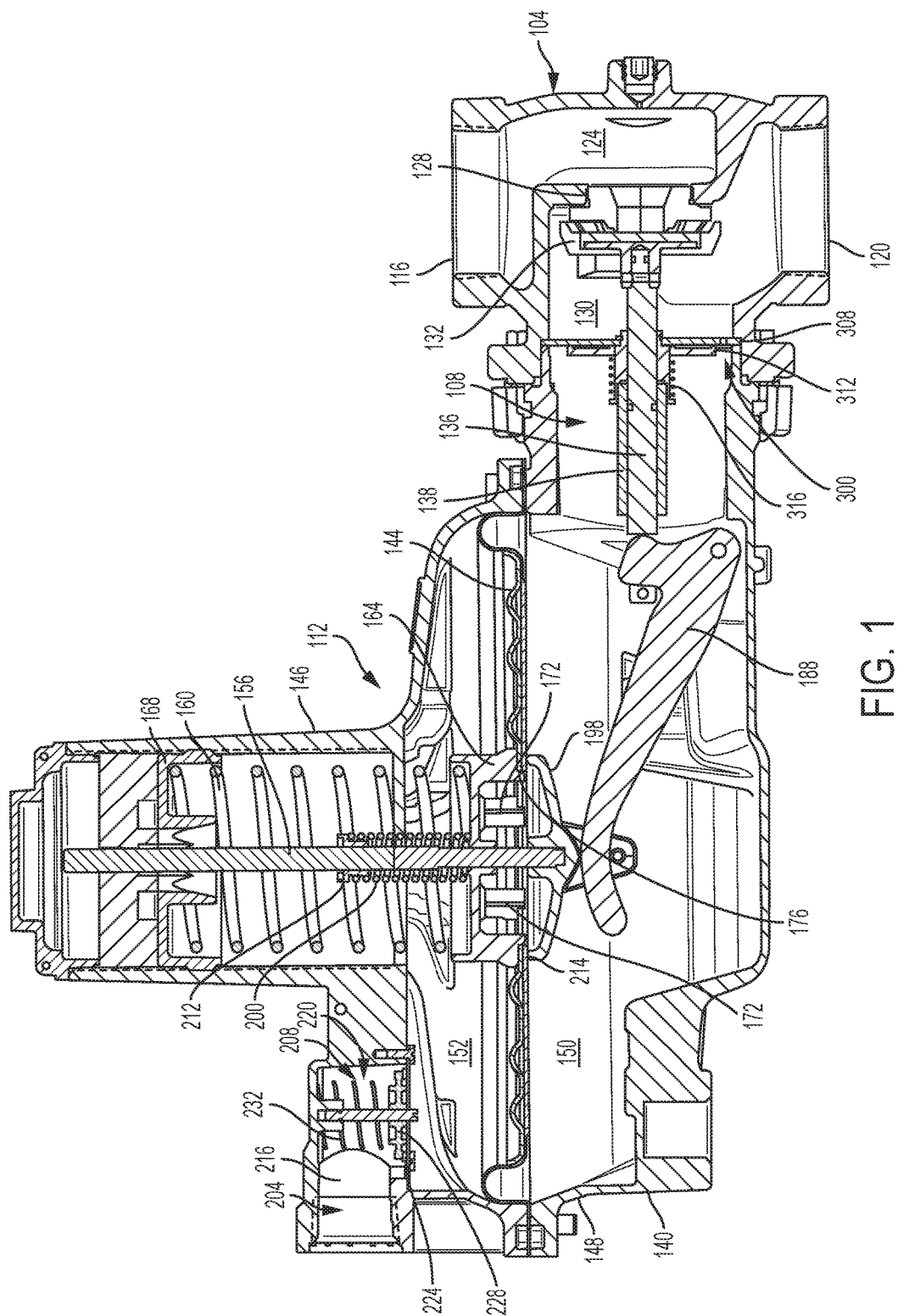
FIG. 1 is a cross-sectional view of a fluid regulator having one example of a stabilizing cartridge constructed in accordance with the teachings of the present disclosure.

FIG. 1 illustrates one example of a fluid regulator 100 constructed in accordance with the present disclosure. The fluid regulator 100 generally includes a regulator body 104, a control assembly 108, and an actuator assembly 112. The control assembly 108 is generally configured to control fluid flow through the regulator body 104. The actuator assembly 112 is generally configured to control the control assembly 108, thereby controlling fluid flow through the regulator body 104.

The regulator body 104 defines a fluid inlet 116, a fluid outlet 120, a fluid flow path 124, and an orifice 128. The fluid flow path 124 extends between the fluid inlet 116 and the fluid outlet 120. The orifice 128 is operatively disposed between the fluid inlet 120 and the fluid outlet 124. The fluid flow path 124 also includes a throat area 130.

The control assembly 108 is disposed for displacement in the regulator body 104 for controlling the flow of fluid therethrough. The control assembly 108 includes a control element 132 and a valve stem 136 connected to the control element 132 via any suitable manner. The control element 132 illustrated in FIG. 1 takes the form of a valve plug or valve disk, though other control elements 132 may be used. The control assembly 108 also includes a stem guide 138 coupled to and surrounding a portion of the valve stem 136.

The actuator assembly 112 is operatively connected to the regulator body 104 to control the position of the control element 108 relative to the orifice 128. The actuator assembly 112 includes a housing 140, a diaphragm 144 disposed within the housing 140, and a linkage operatively connecting the diaphragm 144 to the control element 108. The actuator housing 140 is formed of a first or spring case 146 and a second or diaphragm case 148 secured together, such as with one or more bolts connecting respective outer flanges of the first and second cases 146, 148. The diaphragm 144 separates the housing 140 into a first chamber 150 and a second chamber 152. The first chamber 150 is defined at least partly by one side of the diaphragm 144 and the diaphragm case 148. The second chamber 152 is defined at least partly by the other side of the diaphragm 144 and the spring case 146.

The actuator assembly 112 also includes a stem 156, a control spring 160, a first spring seat 164, and a second spring seat 168. The first spring seat 164 guides the stem 156 and is disposed on top of the diaphragm 144 within the second chamber 152 of the actuator housing 140. The first spring seat 164 defines a plurality of openings 172 that are concentric with an opening 176 formed through a central portion of the diaphragm 144. The first spring seat 164 receives and supports a first end of the control spring 160, as illustrated in FIG. 1. The second spring seat 168, which likewise helps to guide the stem 156 and is disposed within the second chamber 152, receives a second end of the control spring 160 opposite the first end. So arranged, the control spring 160 biases the diaphragm 144 in a direction (a rightward direction in the orientation shown in FIG. 2) against the fluid pressure with a selected force so as to maintain a pressure at the outlet 120 within a pre-selected range. The force exerted by the control spring 160 can be adjusted via, e.g., an adjusting screw, as is known in the art.

The actuator assembly 112 further includes a linkage operatively connecting the diaphragm 144 to the control assembly 108. The linkage includes a lever 188 that has a first end operatively connected to the diaphragm 144 (via the stem 156) and a second end operatively connected to the valve stem 136. Movement of the diaphragm 144 in response to pressure changes at the outlet 120 causes the linkage to shift the control element 108 in a manner so as to maintain the process fluid pressure within the pre-selected range set by the control spring 160.

With the fluid regulator 100 configured as described, the diaphragm-based actuator 112 serves to position the control element 132 relative to the flow path 124 to satisfy desired process control parameters (e.g., a desired set-point pressure). The control spring 160 of the actuator assembly 112 naturally biases the diaphragm 144 (in a rightward direction when viewed in FIG. 1), which translates into a movement of the control assembly 108 toward an open position. In order to move the control assembly 108 toward a closed position, a pneumatic signal can be supplied to the first chamber 150 to increase the pressure in the first chamber 150. The pneumatic signal can, for example, be supplied in response to or based on a pressure at the outlet 120, detected by a feedback pressure sensor, that is less than the desired set-point pressure. In any event, this increase in pressure is sensed by the diaphragm 144 and ultimately overcomes the force applied by the control spring 160, thereby moving the diaphragm 144 in the leftward direction (in the orientation shown in FIG. 1) and moving the lever 188, the valve stem 136 and, in turn, the control element 132 toward the closed position. When the pneumatic signal supplied to the first chamber 150 is reduced and/or eliminated, the spring 160 can expand and urge the diaphragm 144 rightward and, in turn, the lever 188, the valve stem 136, and the control element 132 back toward the open position.

With continued reference to FIG. 1, the fluid regulator 100 also includes over pressure protection, provided, at least in this example, by a pressure relief valve 198, a relief spring 200, an exhaust port 204, and an exhaust valve 208. In the event that an over pressure condition occurs, i.e., the pressure at the outlet 120 rises above a pre-determined threshold pressure set by, for example, the relief spring 200, which typically happens when the fluid regulator 100 or some other component in the system in which the fluid regulator 100 is employed fails, the pressure relief valve 198 and the exhaust valve 208 open to exhaust at least a portion of the fluid to atmosphere via the exhaust port 204, thereby reducing the pressure in the system and protecting equipment downstream of the fluid regulator 100.

The pressure relief valve 198, which in this example takes the form of a pusher post, is arranged in the first chamber 150 and coupled (e.g., threaded) to the stem 156, as illustrated in FIG. 1. The pressure relief valve 198 defines an annular seating surface 214 that selectively engages the diaphragm 144, depending upon the pressure condition, as will be described in greater detail below. The pressure relief valve 198 also receives an end portion of the lever 188, as illustrated in FIG. 1.

The relief spring 200, like the control spring 156, is disposed within the second chamber 152. The relief spring 200 has a first end seated against the first spring seat 164 (which also supports the control spring 156) and a second end seated against a relief spring seat 212 that is coupled to the stem 156. So arranged, the relief spring 200 biases the diaphragm 144 in a direction (leftward, when viewed in FIG. 1) opposite the direction of the biasing force applied by the control spring 160.

The exhaust port 204 is formed or defined in the spring case 146 of the housing 140. The exhaust port 204 is, in this example, an L-shaped cavity including a first or vertical portion 216 and a second or horizontal portion 220. The first portion 216 defines a seating surface 224 and is in selective fluid communication with the second chamber 152, depending upon the position of the exhaust valve 208 relative to the seating surface 224. The second portion 220 is in fluid communication with the first portion 216 and the atmosphere, such that fluid that flows into the first portion 216 from the second chamber 152 can be exhausted to the atmosphere.

The exhaust valve 208 includes a valve plug 228 and a release spring 232, each of which is disposed in the second portion 220 of the exhaust port 204. The valve plug 228 is movable relative to the seating surface 224 to control fluid flow through the exhaust port 204, and, ultimately, to the atmosphere. The release spring 232, meanwhile, is arranged to bias the valve plug 228 into a closed position in sealing engagement with the seating surface 224.

In normal operation, the seating surface 214 of the pressure relief valve 198 sealingly engages the diaphragm 144, thereby preventing fluid communication between the first and second chambers 150, 152. However, in the event that the pressure at the outlet 120 rises above the pre-determined pressure, thereby indicating the existence of an overpressure condition, the pressure forces the diaphragm 144 and the first spring seat 164 leftward (in the orientation shown in FIG. 1), thereby compressing the relief spring 200 against the relief spring seat 212. This, in turn, disengages the seating surface 214 of the pressure relief valve 198 from the diaphragm 144, which allows fluid to flow through the openings 172, 176 and into the second chamber 152. As the second chamber 152 is filled with fluid, the pressure within the second chamber 152 increases. At some point, the pressure within the second chamber 152 rises above a predetermined release pressure, which is set by the release spring 232, driving the valve plug 228 leftward, away from the seating surface 224, and allowing fluid from the second chamber 152 to be exhausted to atmosphere via the exhaust port 204.

As discussed above, the operational stability, and thus the capacity and operation, of a fluid regulator such as the fluid regulator 100 may be adversely affected by other components used in conjunction with the fluid regulator. To prevent any adverse effects, the present disclosure provides various stabilizer cartridges that, when arranged between the throat area 130 and the first chamber 150 of the fluid regulator, enhance the stability of the fluid regulator 100 by blocking or at least limiting potentially destabilizing feedback (e.g., in the form of pulsations) from downstream equipment and by creating an air dampener effect under the diaphragm 144 so as to prevent rapid fluctuations that would cause instability. Beneficially, these stabilizer cartridge achieve this aim without adversely affecting the over pressure protection functionality described above. In other words, the stabilizer cartridges described herein serve to enhance stability, but permit the fluid flow necessary to register pressure at the outlet 120 and do not block or limit the flow necessary to resolve an over pressure condition, should one occur.

Figure 2:
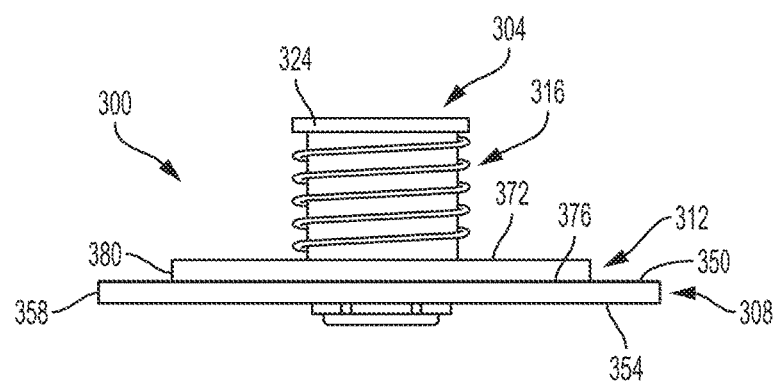
FIG. 2 is a side view of the stabilizing cartridge of FIG. 1.
Figure 3:
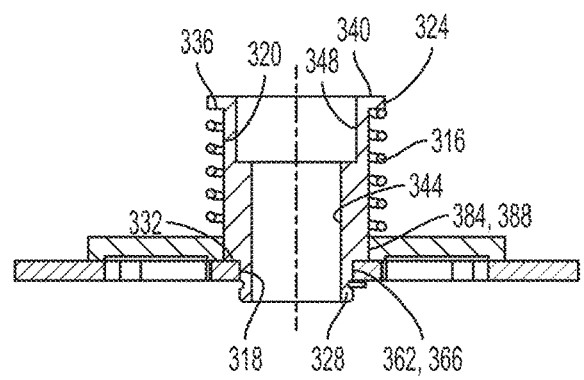
FIG. 3 is a cross-sectional view of FIG. 2.
Figure 4:
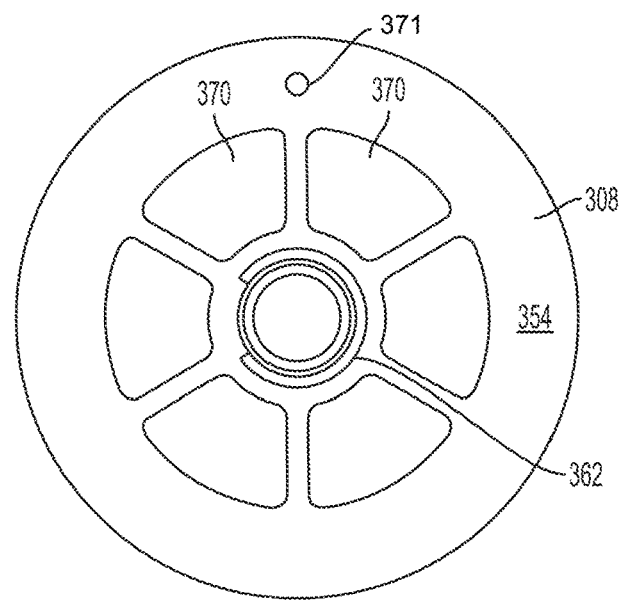
FIG. 4 is a bottom view of FIG. 2.

FIGS. 2-4 depict one example of a stabilizer cartridge 300 constructed in accordance with the present disclosure. The stabilizer cartridge 300 is made of plastic and generally includes a body 304, a first disk 308 coupled to the body 304, a second disk 312 movably coupled to the body 304, and a biasing element 316. In other examples, the stabilizer cartridge 300 can include additional, different, or fewer components.

As best shown in FIGS. 2 and 3, the body 304 has a first annular portion 318, a second annular portion 320, and a flanged portion 324. The first annular portion 318 defines a first end 328 of the body 304 and has an outer diameter that is smaller than the outer diameter of the second annular portion 320. The first annular portion 318 transitions to the second annular portion 320 (and vice-versa) at or via a first shoulder 332. The second annular portion 320 transitions to the flanged portion 324 at or via a second shoulder 336. The flanged portion 324 defines a second end 340 of the body 304 opposite the first end 328. The body 304 also includes first and second bores 344, 348 that extend therethrough along a longitudinal axis 352, as shown in FIG. 3. The first bore 344, which extends through the first annular portion 318 and through a portion of the second annular portion 320, is sized to receive the valve stem 136. The second bore 348, which has a diameter larger than a diameter of the first bore 344, extends through a portion of the second annular portion 320 and the flanged portion 324, is sized to receive the valve stem 136 and the stem guide 138.

The first disk 308 has an annular shape defined by a flat, top surface 350, a flat, bottom surface 354 opposite the top surface 350, and a circumferential edge 358. An opening 362 is formed through a central portion of the first disk 308, thereby defining an inner edge 366 of the first disk 308. When the first disk 308 is coupled to the body 304, the inner edge 366 of the first disk 308 receives and engages the first annular portion 318 of the body 304, and the top surface 350 is seated against the first shoulder 332 of the body 304. As such, the first disk 308 is retained in position on the body 304 immediately proximate or adjacent the first end 328.

As best illustrated in FIG. 4, the first disk 308 also includes one or more windows 370 concentrically arranged about the opening 362. In the illustrated example, the first disk 308 includes seven (7) windows 370. In other examples, the first disk 308 can include more or less windows 370 and/or differently shaped windows 370. In any event, the windows 370, when exposed, facilitate fluid flow in the event of an over pressure condition, as will be described in greater detail below. The first disk 308 also includes an aperture 371 that is formed therethrough at a position radially outward of the windows 370 but radially inward of the circumferential edge 358. The aperture 371 facilitates registration of the pressure at the outlet 120. In other words, the diaphragm 144 can sense the downstream pressure via the aperture 371. In this example, the aperture 371 has a diameter of ⅛ inches, though in other examples, the aperture 371 can have a larger or smaller diameter. In other examples, the first disk 308 can include multiple similarly sized or different apertures 371 for the purpose of registering the pressure at the outlet 120.

The second disk 312 also has an annular shape defined by a flat, top surface 372, a flat, bottom surface 376 opposite the top surface 372, and a circumferential edge 380, but the second disk 312 has an outer diameter that is smaller than an outer diameter of the first disk 308. An opening 384 is formed through a central portion of the second disk 312, thereby defining an inner edge 388 of the second disk 312, though the opening 384 is larger than the opening 362. When the second disk 312 is coupled to the body 304, the inner edge 388 of the second disk 312 receives and engages the second annular portion 320 of the body 304. Unlike the first disk 308, the second disk 312 is not fixedly retained in position. Instead, the second disk 312 is movably disposed on and along the body 304, such that the second disk 312 is movable relative to the first disk 308.

With reference back to FIGS. 2 and 3, the biasing element 316 in this example takes the form of a biasing spring. The biasing element 316 is disposed on the second annular portion 320 of the body 304 between the second disk 312 and the flanged portion 324 of the body 304. It will be appreciated that the biasing element 316 thus biases the second disk 312 toward and into contact with the first disk 308, as illustrated in FIG. 3, such that the second disk 312, and more particularly the bottom surface 376 of the second disk 312, sealingly engages the windows 370 of the first disk 308, preventing fluid flow therethrough.

FIG. 1 also illustrates the stabilizing cartridge 300 when coupled to the fluid regulator 100. As briefly noted above, the stabilizing cartridge 300 is arranged between the throat area 130 and the first chamber 150 of the fluid regulator 100. The stabilizing cartridge 300 is thus positioned proximate to the inlet 116 and the outlet 120 of the fluid regulator 100, such that the stabilizing cartridge 300 is positioned to block or at least limit destabilizing pulsations from entering, and resonating within, the fluid regulator 100. At the same time, however, the stabilizing cartridge 300 allows the diaphragm 144 to sense the pressure at the outlet 120 (via the aperture 372), and permits fluid flow from the outlet 120, through the throat area 130 (via the windows 370), and to the atmosphere (via the exhaust port 204) in the event an over pressure condition occurs. In such a case, i.e., when the pressure at the outlet 120 increases due to, for example, a failure in the pressure regulator 100 or other another component in the system in which the regulator 100 is employed, the force generated by the pressure increase and applied to the bottom surface 376 of the second disk 312 (as the fluid flows through the windows 370) overcomes the biasing force applied in the opposite direction by the biasing spring 316. This, in turn, causes the second disk 312 to move away from the first disk 308, such that the second disk 312 moves from the closed position shown in FIG. 1, wherein the second disk 312 contacts the first disk 308 and sealingly engages the windows 370 of the first disk 308, to an open position, not shown, wherein the second disk 312 is spaced from the first disk 308, exposing the windows 370. Fluid thus flows through the windows 370, is directed around the second disk 312, and then flows to the first chamber 150, to the second chamber 152 via the openings 172, 176 (as described above), and to and out of the exhaust port 204 as described above. In this manner, the stabilizer cartridge 300 allows the over pressure condition to be relieved in an efficient manner. Upon relief of the over pressure condition, the second disk 312 moves back to the closed position shown in FIG. 1, wherein the second disk 312 contacts the first disk 308 and sealingly engages the windows 370 of the first disk 308, such that the windows 370 are no longer in fluid communication with the openings 172, 176 or the exhaust port 204.

Figure 5:
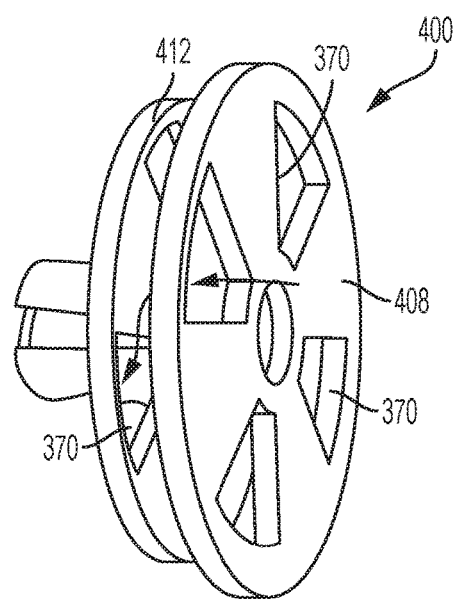
FIG. 5 is a perspective view of another example of a stabilizing cartridge constructed in accordance with the teachings of the present disclosure.

FIG. 5 illustrates another example of a stabilizing cartridge 400 that can be employed in the fluid regulator 100 to enhance the stability of the regulator 100 without affecting the operation or over pressure functionality of the regulator 100. The stabilizing cartridge 400 is similar to the stabilizing cartridge 300 described above, but the stabilizing cartridge 400 includes first and second disks 408, 412 that are different than the first and second disks 308, 312 of the cartridge 300. Like the first disk 308, the first disk 408 includes a plurality of concentrically arranged windows 370, but the first disk 408 only includes four windows 370 (as opposed to the seven windows 370 included in the first disk 370). Meanwhile, the second disk 412, unlike the second disk 312, also includes a plurality of concentrically arranged windows 370. In the illustrated example, the second disk 412 also includes four windows 370 (only two of which are visible in FIG. 5). Preferably, the first and second disks 408, 412 are arranged such that the four windows 370 of the second disk 412 are offset from the four windows 370 of the first disk 408.

When the stabilizing cartridge 400 is coupled between the throat area 130 and the first chamber 150, the stabilizing cartridge 400 is operable in a similar manner as the stabilizing cartridge 300, with the exception that when the second disk 412 is moved to an open position, fluid flows through the windows 370 of the first disk 408 and then flows through the windows 370 of the second disk 412.

Figure 6:
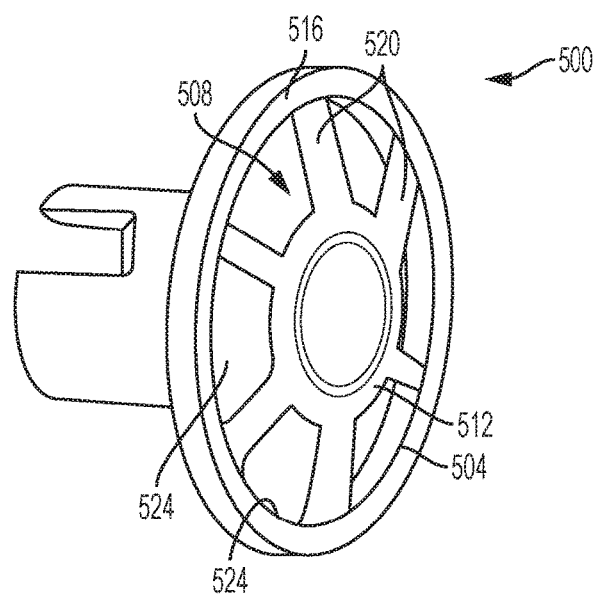
FIG. 6 is a perspective view of another example of a stabilizing cartridge constructed in accordance with the teachings of the present disclosure.

FIG. 6 illustrates another example of a stabilizing cartridge 500 that can be employed in the fluid regulator 100 to enhance the stability of the regulator 100 without affecting the over pressure functionality of the regulator 100. Instead of utilizing first and second disks like the cartridges 300, 400, the cartridge 500 includes a plastic frame element 504 and a flexible membrane 508 coupled to the frame element 504. As illustrated, the frame element 504 has an inner ring 512 and a concentric outer ring 516 joined to the inner ring 512 via a plurality of radially extending spokes 520. A plurality of windows 524 are defined between the inner ring 512, the outer ring 516, and a respective pair of adjacent spokes 520. The flexible membrane 508, which in this example is made of rubber, has an outer diameter substantially equal to an outer diameter of the outer ring 516 of the element 504. The flexible membrane 508 also has a central aperture that has a diameter of substantially equal size to the diameter of the inner ring 512.

When the stabilizing cartridge 500 is arranged between the throat area 130 and the first chamber 150, the flexible membrane 508 operates in a similar manner as the second disk 412 in that the flexible membrane 508 is movable, relative to the frame element 504, to facilitate fluid flow through the windows 524 of the frame element 504 responsive to an over pressure condition.

Figure 7A:
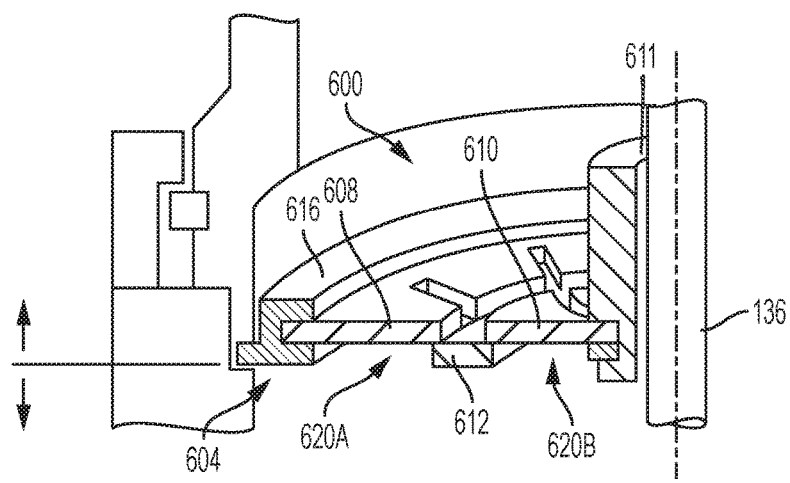
FIG. 7A is a perspective view of a portion of another example of a stabilizing cartridge constructed in accordance with the teachings of the present disclosure, shown in a closed position.
Figure 7B:
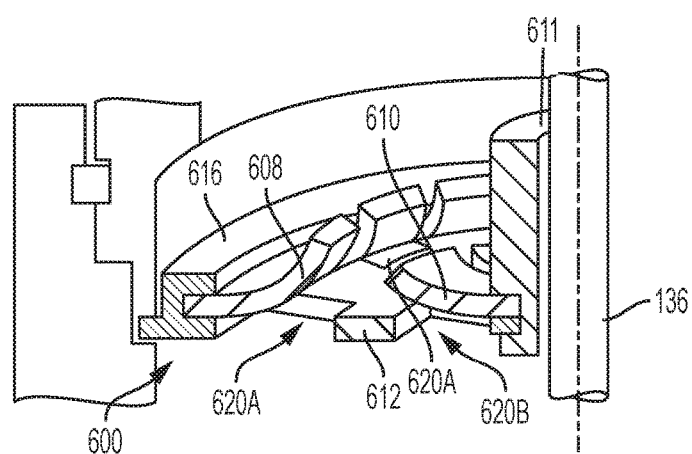
FIG. 7B is similar to FIG. 7A, but shows the stabilizing cartridge in an open position.

FIGS. 7A and 7B illustrate a portion of another example of a stabilizing cartridge 600 that can be employed in the fluid regulator 100 to enhance the stability of the regulator 100 without affecting the over pressure functionality of the regulator 100. The stabilizing cartridge 600 illustrated in FIGS. 7A and 7B includes a frame element 604 and first and second flexible membranes 608, 610 coupled to the frame element 604. The frame element 604 has a central portion 611, an inner ring 612 joined to the central portion via a plurality of radially extending spokes (not shown, but similar to the spokes 520 described above), and a concentric outer ring 616 joined to the inner ring 612 via another plurality of radially extending spokes (again not shown, but similar to the spokes 520). A first plurality of windows 620A are defined between the central portion 611 and the inner ring 612, and a second plurality of windows 620B are defined between the inner ring 612 and the outer ring 616 (only one of which is visible in FIGS. 7A and 7B). As illustrated, the first flexible membrane 608, which in this example is made of rubber, is coupled to (e.g., received in) the outer ring 616 such that the first flexible membrane 608 is disposed over (i.e., covers) the first plurality of windows 620A. As such, the first flexible membrane 608 may be referred to as the outer membrane. Likewise, the second flexible membrane 610, which in this example is made of rubber, is coupled to (e.g., received in) the central portion 611 such that the second flexible membrane 610 is disposed over (i.e., covers) the second plurality of windows 620B. As such, the second flexible membrane 610 may be referred to as the inner membrane.

When the stabilizing cartridge 600 is arranged between the throat area 130 and the first chamber 150, the stabilizing cartridge 600 is movable between the closed position shown in FIG. 7A and the open position shown in FIG. 7B, responsive to an over pressure condition. In the closed position shown in FIG. 7A, the first and second flexible membranes 608, 610 sealingly engage the first and second pluralities of windows 620A, 620B, respectively, thereby preventing fluid flow to the first chamber 150. However, responsive to an over pressure condition, the first and second flexible membranes 608, 610 are driven (e.g., rotate) inward, toward the first chamber 150, from the closed position shown in FIG. 7A to the open position shown in FIG. 7B by the fluid flowing through the windows 620A, 620B. This separates the first and second membranes 608, 610 from the windows 620A, 620B, allowing fluid to flow through the windows 620A, 620B to the first chamber 150 (and ultimately to the atmosphere via the exhaust port 204).

While the stabilizing cartridge 600 includes two flexible membranes 608, 610 that are movable in an inward direction responsive to an over pressure condition, it will be appreciated that in other examples, one of the two flexible membranes 608, 610 can be repositioned so as to move in an outward direction (i.e., away from the first chamber 150) such that fluid can quickly flow out of the first chamber 150 when desired.

Finally, it will be appreciated that while the cartridges 300, 400, 500, and 600 are described in connection with the fluid regulator 100, the cartridges 300, 400, 500, and 600 can be utilized in any number of other fluid regulators. In some cases, the cartridges 300, 400, 500, and 600 can be retrofit to existing fluid regulators. In such cases, the cartridges 300, 400, 500, and 600 can be readily added to an existing fluid regulator by removing the control element (e.g., control element 132) and positioning the desired cartridge over (i.e. around) the valve stem in the proper position as described herein.

The invention claimed is:

1. A stabilizer cartridge for enhancing stability of a fluid regulator having a regulator body, a control element configured to control a fluid flow through the regulator body, a valve stem coupled to the control element, and an actuator assembly operatively coupled to the valve stem to control a position of the control element, the stabilizer cartridge comprising:
    a body adapted to be disposed around the valve stem;
    a first disk coupled to the body and defining one or more flow paths for facilitating pressure relief;
    a second disk movably coupled to the body, the second disk being movable relative to the first disk responsive to fluid flow through the one or more flow paths of the first disk,
    wherein the one or more flow paths comprise a plurality of windows extending radially around a central opening in the first disk; and
    an aperture formed in the first disk for sensing pressure at an outlet of the regulator body, wherein the aperture is a through-hole that extends from a first side through to an opposing second side of the first disk at a position between the plurality of windows and an outer perimeter of the first disk.

2. The stabilizer cartridge of claim 1, wherein the body comprises a bore sized to receive the valve stem.

3. The stabilizer cartridge of claim 1, further comprising a biasing element arranged to bias the second disk into contact with the first disk.

4. The stabilizer cartridge of claim 3, wherein the body comprises a flanged portion, the biasing element being disposed around the body between the flanged portion and the second disk.

5. The stabilizer cartridge of claim 1, wherein the second disk is movable between a first position, in which the second disk contacts the first disk such that the one or more flow paths are closed, and a second position, in which the second disk is spaced from the first disk such that the one or more flow paths are opened.

6. The stabilizer cartridge of claim 1, wherein the first disk has a first diameter and the second disk has a second diameter less than the first diameter.

7. The stabilizer cartridge of claim 1, wherein the second disk has a diameter that covers the plurality of windows but exposes the aperture when the second disk contacts the first disk.

8. A stabilizer cartridge for enhancing stability of a fluid regulator having a regulator body, a control element configured to control a fluid flow through the regulator body, a valve stem coupled to the control element, and an actuator assembly operatively coupled to the valve stem to control a position of the control element, the stabilizer cartridge comprising:
 a body adapted to be disposed around the valve stem, the body having a first end and a second end opposite the first end;
 a first disk coupled to the body proximate the first end, the first disk defining one or more flow paths for facilitating pressure relief;
 a second disk movably coupled to the body, the second disk being movable relative to the first disk responsive to fluid flow through the one or more flow paths of the first disk;
 a biasing element arranged between the second disk and the second end of the body, the biasing element configured to bias the second disk toward the first disk,
 wherein the one or more flow paths comprise a plurality of windows extending radially around a central opening in the first disk; and
 an aperture formed in the first disk for sensing pressure at an outlet of the regulator body, wherein the aperture is a through-hole that extends from a first side through to an opposing second side of the first disk at a position between the plurality of windows and an outer perimeter of the first disk.

9. The stabilizer cartridge of claim 8, wherein the body comprises a bore sized to receive the valve stem.

10. The stabilizer cartridge of claim 8, wherein the second disk is movable between a first position, in which the second disk contacts the first disk such that the one or more flow paths are closed, and a second position, in which the second disk is spaced from the first disk such that the one or more flow paths are opened.

11. The stabilizer cartridge of claim 8, wherein the first disk has a first diameter and the second disk has a second diameter less than the first diameter.

12. The stabilizer cartridge of claim 8, wherein the second disk has a diameter that covers the plurality of windows but exposes the aperture when the second disk contacts the first disk.

13. A fluid regulator, comprising:
 a regulator body defining an inlet, an outlet, and a fluid passageway between the inlet and the outlet, the fluid flow passageway comprising a throat area;
 a control element configured to control fluid flow through the fluid passageway;
 a valve stem coupled to the control element;
 an actuator assembly operatively coupled to the valve stem to control a position of the control element, the actuator comprising:
  an actuator housing;
  a diaphragm disposed in the actuator housing, the diaphragm configured to sense a pressure at the outlet via the throat area;
  a first chamber defined adjacent a first side of the diaphragm;
  a second chamber defined adjacent a second side of the diaphragm; and
  an exhaust port formed in the actuator housing to fluidly couple the second chamber to atmosphere; and
 a stabilizer cartridge arranged between the first chamber and the throat area of the regulator body, the stabilizer cartridge comprising:
  a body sized to receive the valve stem;
  a first disk coupled to the body and defining one or more flow paths, the one or more flow paths in selective fluid communication with the exhaust port;
  a second disk movably coupled to the body, the second disk being movable relative to the first disk, responsive to fluid flowing through the one or more flow paths, between a first position, in which the second disk sealingly engages the one or more flow paths of the first disk, such that the flow one or more paths are not in fluid communication with the exhaust port, and a second position, in which the second disk is spaced from the one or more flow paths of the first disk, such that the flow paths are in fluid communication with the exhaust port,
  wherein the one or more flow paths comprise a plurality of windows extending radially around a central opening in the first disk; and
  an aperture formed in the first disk, wherein the aperture is a through-hole that extends from a first side through to an opposing second side of the first disk at a position between the plurality of windows and an outer perimeter of the first disk, and wherein the diaphragm senses a pressure at the outlet via the aperture.

14. The fluid regulator of claim 13, wherein responsive to an over pressure condition, the second disk moves from the first position to the second position, such that the fluid flows to the exhaust port to relieve the over pressure condition.

15. The fluid regulator of claim 13, wherein the stabilizer cartridge further comprises a biasing element arranged to bias the second disk to the first position.

16. The fluid regulator of claim 15, wherein the body comprises a flanged portion, the biasing element being disposed around the body between the flanged portion and the second disk.

17. The fluid regulator of claim 13, further comprising a pressure relief valve, wherein, responsive to an overpressure condition, the pressure relief valve is movable relative to the diaphragm from a first position in which the pressure relief valve engages the diaphragm, preventing fluid communication between the first and second chambers, to a second position in which the pressure relief valve is separated from the diaphragm, allowing fluid communication between the first and second chambers.

18. The fluid regulator of claim 13, wherein the second disk has a diameter that covers the plurality of windows but exposes the aperture when the second disk contacts the first disk.

* * * * *

UNITED STATES PATENT AND TRADEMARK OFFICE
CERTIFICATE OF CORRECTION

PATENT NO. : 10,302,209 B2
APPLICATION NO. : 15/253788
DATED : May 28, 2019
INVENTOR(S) : James C. Hawkins et al.

Page 1 of 1

It is certified that error appears in the above-identified patent and that said Letters Patent is hereby corrected as shown below:

In the Specification

At Column 8, Lines 14-15, "aperture 372)," should be -- aperture 371), --.

In the Claims

At Column 12, Line 24, "flow one or more paths" should be -- one or more flow paths --.

Signed and Sealed this
Tenth Day of November, 2020

Andrei Iancu
*Director of the United States Patent and Trademark Office*